(12) United States Patent
Barth

(10) Patent No.: US 6,238,805 B1
(45) Date of Patent: May 29, 2001

(54) LOW-STRESS INTERFACE BETWEEN MATERIALS HAVING DIFFERENT COEFFICIENTS OF EXPANSION AND METHOD FOR FABRICATING SAME

(75) Inventor: Phillip W. Barth, Portola Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/415,286

(22) Filed: Oct. 8, 1999

(51) Int. Cl.$^7$ ........................................ B32B 3/12
(52) U.S. Cl. ................ 428/594; 428/212; 156/308.4; 156/313; 156/325; 156/307.3
(58) Field of Search .................. 428/416, 458, 428/596, 597, 607, 901, 902, 140, 212, 251, 617, 653, 683, 594; 156/307.1, 307.3, 313, 308.4, 325

(56) References Cited

U.S. PATENT DOCUMENTS

| | | | |
|---|---|---|---|
| 3,673,049 | * | 6/1972 | Giffen et al. . |
| 4,009,752 | * | 3/1977 | Wilson . |
| 4,496,793 | * | 1/1985 | Hanson et al. . |
| 4,526,842 | * | 7/1985 | Eide . |
| 5,699,462 | | 12/1997 | Fouquet et al. ................... 385/18 |

* cited by examiner

Primary Examiner—Merrick Dixon

(57) ABSTRACT

A low-stress interface between materials having different thermal coefficients of expansion and method for fabricating same includes using a laminated composite layer having a lateral thermal coefficient of expansion (TCE) that is matched to the TCE of another layer of material that is joined thereto. Using a laminate material having a lateral TCE similar to the TCE of the material to which it is joined equalizes the lateral thermal expansion of the two materials at the interface therebetween and minimizes the stress placed on the material that joins the two materials. Furthermore, the layer of material to which the laminate is joined can also be a laminate.

25 Claims, 3 Drawing Sheets

LOW-STRESS INTERFACE BETWEEN MATERIALS HAVING DIFFERENT COEFFICIENTS OF EXPANSION AND METHOD FOR FABRICATING SAME

TECHNICAL FIELD

The present invention relates generally to joining dissimilar materials, and, more particularly, to a low-stress interface between materials having different thermal coefficients of expansion and method for fabricating same.

BACKGROUND OF THE INVENTION

Microsystems use the properties and movement of light, mechanical parts, gases, liquids, and electrons on a sub-millimeter scale to obtain useful functionality in optical, chemical, physical, biological, and electronics applications The joining of dissimilar materials in such systems poses challenges in fabrication, storage, and functionality due to bending, stress, and creep at the interface between such materials. Such an interface region is typically an active part of the device, not merely a passive mechanical joint.

As an example of a microsystem, commonly assigned U.S. Pat. No. 5,699,462 to Fouquet et al., which is hereby incorporated by reference, describes a microfluidic optical switch element located in a liquid-filled trench etched in glass at the intersection of two planar optical waveguide elements. The filling liquid has an index of refraction that matches that of the waveguide elements. If no gas-phase bubble is present at the intersection of the two waveguide elements, incoming light from either waveguide element continues through the trench on a straight-line path and exits on the opposite side of the trench into the continuation of that waveguide element on the opposite side of the trench. However, if a gas-phase bubble is present in the trench, the trench then has an index of refraction much lower than that of the waveguide elements, so that incoming light in one waveguide reflects at the surface of the bubble and is diverted into the other waveguide. The gas-phase bubble can be introduced and removed by electrical resistor heating means to perform optical switching.

The above-described optical switch element may be fabricated into an array of such switches, for example with 32 input channels, which can be switched to any of 32 output channels. This arrangement is referred to as a 32×32 switch, and contains 32×32=1,024 individual switch elements. The waveguides and associated trenches of such a switch are typically fabricated in a planar glass substrate with mechanical properties substantially identical to those of fused silica, most particularly with a very low coefficient of thermal coefficient of expansion (TCE) of 0.55 parts per million per degree Celsius (0.55 ppm/° C.). A ribbon cable of 32 single-mode optical fibers, typically on 250 micrometer (250 $\mu$m) centers can be attached to each of four edges of the glass substrate to provide input and output channels. Alignment of each single-mode fiber core to each planar waveguide element should occur with sub-micrometer accuracy to provide low insertion loss.

The resistive heating means of the 32×32 switch is typically a planar array of thin-film electrical resistors on a planar silicon integrated circuit substrate, most particularly with a TCE of 2.6 ppm/° C., which is low in comparison to most engineering materials but is substantially larger than that of fused silica.

To fabricate the complete 32×32 switch, the planar silicon substrate is attached to the planar glass substrate using some hermetic sealing means so that the resulting device can then be filled with a liquid whose index of refraction matches that of the planar waveguide elements. Subsequently, optical fiber ribbon cables can be attached to the edges of the planar glass substrate in an optically-active mode in which the optical transmission through the planar waveguide elements can be evaluated after the fiber ribbon cables are positioned, but before they are permanently attached. In order to achieve sub-micron accuracy of the alignment of each fiber core to each waveguide element, it is necessary to first obtain sub-micrometer bowing of the planar surface of the glass substrate along each edge of that substrate. Unfortunately, the mismatch between the TCE of the glass and that of the silicon tends to cause bowing of the composite device of at least several micrometers.

Such bowing, when it occurs in a device comprising two metal layers of different TCE, is referred to as a bimetal effect. By extension, such an effect occurring between any two materials of different TCE is also called a bimetal effect.

The bimetal effect between glass and silicon not only causes bowing, but also causes stress at the interface between the two materials as temperature varies. If the glass and silicon are joined to each other by solder at a soldering temperature of, for example, 165° C., where the hot solder freezes to form a solid, then, as the bimetal pair cools toward room temperature the silicon contracts more than the glass. The result is that the glass/silicon pair becomes concave on the silicon side and convex on the glass side, and the solder interface between the two materials experiences shear stress.

To illustrate this effect, shown in FIG. 1A is a cross-sectional schematic view illustrating a conventional microsystem 11 including glass portion 12 joined to silicon portion 14 via solder bond 16. When heated to soldering temperature, both glass portion 12 and silicon portion 14 remain flat with respect to each other.

FIG. 1B is a cross-sectional schematic view of the microsystem 11 of FIG. 1A after cooling to room temperature. As the microsystem 11 begins to cool from soldering temperature silicon portion 14 contracts more than glass portion 12, wherein the microsystem 11 becomes concave on the silicon side and convex on the glass side. This bowing is a result of the above-mentioned bimetal effect.

FIG. 1C is a cross-sectional schematic view illustrating the microsystem 11 of FIGS. 1A and 1B in which a smaller solder bond 16 is used to join glass portion 12 and silicon portion 14. As the microsystem 11 cools, the gap 18 between glass portion 12 and silicon portion 14 varies in thickness along the planar interface between glass portion 12 and silicon portion 14. The TCE difference between glass portion 12 and silicon portion 14 make the use of these two materials inadequate for a microsystem in to which the gap 18 should remain constant.

Typically, devices fabricated using this microsystem technology are required to survive temperatures as low as −40° C. during shipping and storage, and at such low temperatures the solder bond can be expected to fail. Even if outright failure of the bond does not occur, creep of the solder during long-term temperature excursions can lead to lateral and vertical displacement of the heating resistors relative to the waveguide crosspoints.

In addition, and more problematically, it is desirable to form the bond between the glass substrate and the silicon substrate only as a peripheral ring around the active 32×32 array of the two substrates. The use of a peripheral seal, in contrast to a large area seal, maximizes the volume in which microfluidic transport of gas and liquid can occur, and minimizes the structural complexity at each switch location within the 32×32 array. The necessity to include additional solder bond regions within the peripheral solder bond region would complicate the design and fabrication of such arrays, and would increase the cost of fabrication. However, because such a peripheral seal has only a small bonding area between glass and silicon, the stress (force per unit area) in the bond is greater than it would be for a large-area bond, and failure of the bond during temperature excursions becomes even more likely Further, it is desirable to maintain a uniform spacing between the glass substrate and the silicon substrate over all of the 1,024 switch elements in the 32×32 array of switches. The fluid resistance per unit length between two adjacent flat plates varies as the third power of the spacing between the plates, so that small variations in spacing between two plates can produce large variations in fluid resistance. In the case of an optical crosspoint switch array, such variations can lead to differences in bubble control parameters across the array which result in performance difficulties or higher cost for control electronics. Such problems are avoided if uniform spacing between glass and silicon can be obtained and maintained. If the glass and silicon are joined by a peripheral bond and contract differently with temperature, the result is a temperature dependent and positional dependent change in the spacing between glass and silicon.

However, if the glass and silicon have flat planar surfaces which contract laterally, that is, in directions parallel to the planar surfaces, at the same rate with temperature, then the vertical spacing, that is, the spacing in a direction perpendicular to the planar surfaces of the glass and silicon, can remain constant with temperature.

Therefore, it would be desirable to fabricate optical crosspoint switch array in a manner that allows the glass and silicon components to remain substantially flat and parallel to one another, with features on the glass well registered to corresponding features on the silicon, both laterally and vertically, over a wide temperature range and over a long period of time. Further, it is desirable to obtain such advantages in a manner that minimizes the necessary bond area between the glass and the silicon.

SUMMARY OF THE INVENTION

The invention provides a low-stress interface between materials having different thermal coefficients of expansion and method for fabricating same.

The present invention may be conceptualized as a method for fabricating a low-stress interface between a first material and a second material having a dissimilar thermal coefficient of expansion (TCE), the method comprising the following steps forming a laminate including a first layer of a first material and a second layer of an additional material and having a layer of a third material sandwiched therebetween, the laminate having a substantially planar surface and a lateral thermal coefficient of expansion (TCE); and joining the laminate to a second material having a substantially planar surface and a lateral TCE similar to the lateral TCE of the laminate to form the low-stress interface.

In architecture, the invention is a low-stress interface between a first material and a second material having a dissimilar thermal coefficient of expansion (TCE). The invention comprises a laminate including a first layer of a first material and a second layer of an additional material and having a layer of a third material sandwiched therebetween, the laminate having a substantially planar surface and a lateral thermal coefficient of expansion (TCE); and a second material joined to the laminate to form the interface, the second material having a substantially planar surface and a lateral TCE similar to that of the laminate.

The invention has numerous advantages, a few of which are delineated, hereafter, as merely examples.

An advantage of the invention is that it allows an optical crosspoint switch to be reliably fabricated using materials having different thermal coefficients of expansion.

Another advantage of the invention is that it allows an optical crosspoint switch to be reliably connected to an optical fiber connector.

Another advantage of the invention is that it allows the elements of an optical crosspoint switch to be fabricated using material having similar thermal coefficient of expansion.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

The invention provides a low-stress interface between materials having different thermal coefficients of expansion and method for fabricating same.

The invention uses two parts, fabricated from materials of dissimilar thermal expansion coefficient, which are each designed and fabricated to remain flat rather than to bow during temperature excursions, and to have substantially the same thermal expansion rate in lateral directions parallel to the major planar surfaces of the parts. When the two parts are placed adjacent to each other and bonded together, their thermal expansion places little stress on the bond between them. In the direction perpendicular to the planar surfaces of the parts the thermal expansion of each part may differ greatly, but that difference does not stress the interface between the two parts. If there exists an established spacing between the two parts at the interface between them, that gap also remains constant over temperature due to the match in lateral thermal expansion between the parts.

Figure 1A:
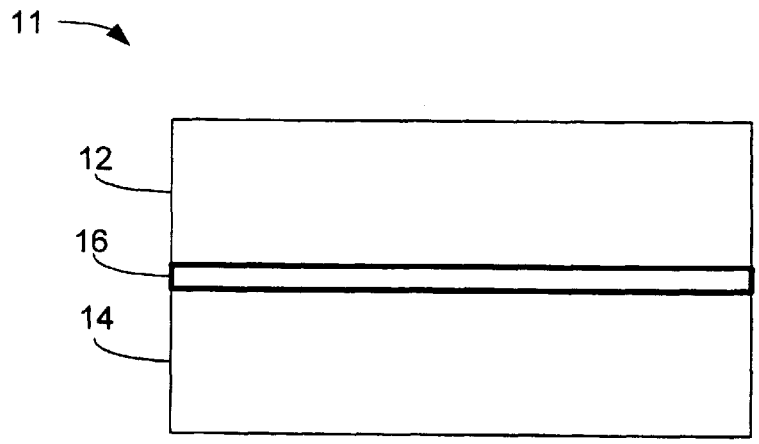
FIG. 1A is a cross-sectional schematic view illustrating a conventional micro system.
Figure 1B:
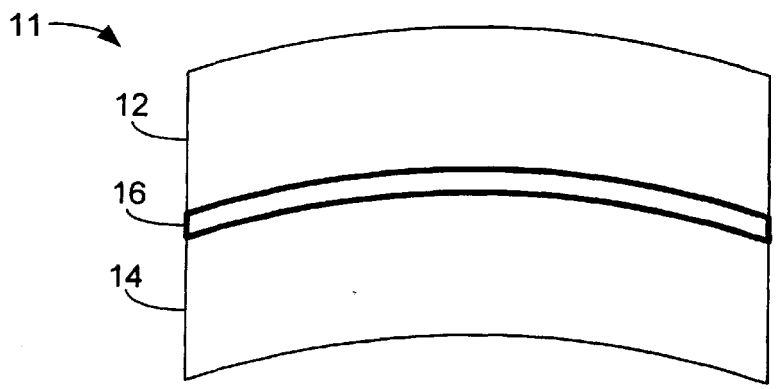
FIG. 1B is a cross-sectional schematic view of the microsystem of FIG. 1A after cooling to room temperature.
Figure 1C:
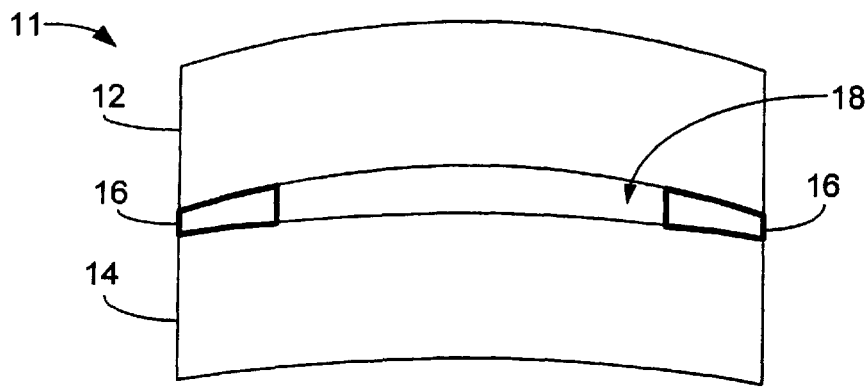
FIG. 1C is a cross-sectional schematic view illustrating the microsystem of FIGS. 1A and 1B in which a smaller solder bond is used to join glass portion and silicon portion.
Figure 2:
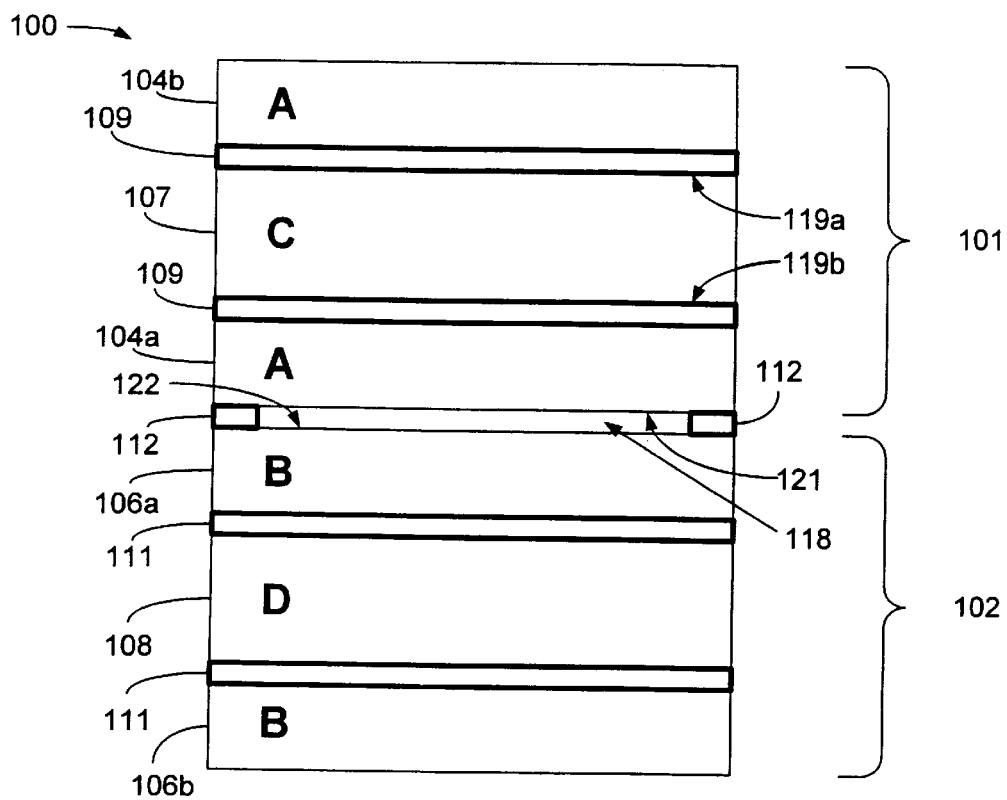
FIG. 2 is a cross-sectional schematic view of a first embodiment of a microsystem constructed using a low-stress interface in accordance with the invention.

The invention comprises designing and fabricating each of the two parts to remain flat during temperature excursions by forming one of the parts either as a unitary material or as a three-layer composite which does not exhibit a bimetal bending effect. Each part is designed and fabricated to match the lateral thermal expansion rate of the other part. The two parts are then placed in apposition and, if desired, bonded together with a bond, which occupies a small portion of the interfacial surface area between the parts. In some applications the joining of the two parts may be temporary, for example if one part is a disposable test unit and the other part is a test fixture, and in such cases no bond between the two parts may be necessary. In other applications such as in optical crosspoint switch arrays a permanent bond may be desired FIG. 2 is a cross-sectional schematic view of a first embodiment of a microsystem 100 constructed using a low-stress interface in accordance with the invention.

Typically, each of the two parts is a planar substrate of a three-layer composite formed as follows. If it is desired to bond a first material "A" 104a having a low TCE to a second material "B" 106a having a higher TCE, then first layers 104a and 104b of material A can be bonded to both sides of a third layer 107 of material "C", which has a high TCE. This forms a composite layer, or laminate, A/C/A 101. A surface 121 of layer 104a is substantially planar. The lateral TCE of composite layer A/C/A 101 is higher than the TCE of material A, i.e., layers 104a and 104b alone. but still less than or equal to the TCE of material B 106a. The lateral TCE is defined as the TCE in the direction lying parallel to the major surfaces of the layers and generally indicated by arrow 115. Because it is symmetrical, the composite layer A/C/A 101 does not bend during temperature excursions so long as the temperature through the layer 101 is uniform. The TCE of material C differs from the TCE of material A in a direction toward the TCE of material B. Still referring to FIG. 2, layers 106a and 106b of second material B are bonded to both sides of a layer 108 of fourth material "D", which can be for example "super Invar" available from Carpenter Technology Corp. of Reading, Pa. Super Invar has a low TCE and is used to form a sandwich structure, or laminate. B/D/B 102. The lateral TCE of composite layer B/D/B is lower than the TCE of second material B 106a and 106b alone, but still greater than or equal to the TCE of first material A 104a and 104b. A surface 122 of layer 106a is substantially planar, similar to that of surface 121 of layer 104a. Again, because it is symmetrical, the composite layer B/D/B 102 does not bend during temperature excursions so long as the temperature through the layer is uniform.

The lateral TCE of each composite layer A/C/A 101 and B/D/B 102, chosen to match that of the other composite layer, can vary over a wide range between the TCE of material A and the TCE of material B, simply by varying the thicknesses of the layers of materials C and D. For example, if the layer of material D is very thin while the layer of material C is very thick, the lateral TCE of each composite can approach the TCE of material B.

Indeed, in one case the thickness of the layer of material D can approach zero, or can become zero, while the thickness of the layer of material C becomes large. In such a case composite layer B/D/B 102 can become a unitary layer of material B. This situation will be illustrated below with respect to FIGS. 4 and 5. Similarly, the thickness of the layer of material C can approach zero, or can become zero, while the thickness of the layer of material D becomes large. In such a case composite layer A/C/A 101 can become a unitary layer of material A. These two cases will usually be found to be far from an engineering optimum, resulting in a total device thickness that is larger than desired and larger than desired interface stresses within one or the other composite layers.

However, these two cases fall within the scope of the invention. In accordance with such scope of these two cases, the concept of composite layer A/C/A 101 is considered to include the case of a unitary substrate of material A, while the concept of composite layer B/D/B 102 is considered to include the case of a unitary substarte of material B.

Furthermore, for simplicity in illustrating the concepts of the invention, the above description has treated the cases of two sandwiches A/C/A 101 and B/D/B 102 in which the outer layers of each sandwich are composed of the same material. Specifically, two layers of material A form the outer layers of sandwich A/C/A 101 while two layers of material B form the outer layers of sandwich B/D/B 102. However, it is not necessary that the outer layers of each sandwich be composed of the same material. The thermal coefficient of expansion of each of the two outer layers of a sandwich should be substantially equal. For example, consider a material E (not shown), which has a TCE substantially equal to that of material A, but which has a lower elastic modulus than material A. A sandwich E/C/A (not shown) could be constructed in which a layer of material E has a greater thickness than the layer of material A, but in which the sandwich does not bow during temperature excursions, and in which the lateral thermal expansion coefficient of sandwich E/C/A matches the lateral thermal expansion coefficient of sandwich B/D/B 102.

Additionally, in the presence of a temperature gradient it can be desirable to depart from the condition that the TCE of material E be substantially equal to that of material A in order to both prevent bowing and maintain the desired lateral thermal expansion coefficient. Such a departure is anticipated by, and within the scope of the invention.

Similarly, consider a material F (not shown), which has a thermal expansion coefficient substantially equal to that of material B, but which has an elastic modulus greater than that of material B. A sandwich B/D/F (not shown) could be constructed in which the layer of material F has a greater thickness that the layer of material B, but in which the sandwich does not bow during temperature excursions, and in which the lateral thermal expansion coefficient of sandwich B/D/F matches the lateral thermal expansion coefficient of sandwich A/C/A 101.

If the materials and their thicknesses are chosen according to a procedure described in detail below, then the lateral TCEs of the two layers A/C/A 101 and B/D/B 102 will be equal. When the two composite layers, 101 and 102, are mated together to form microsystem 100 having the structure A/C/A:B/D/B, where the colon symbol (:) designates the interface between the two composite layers, the lateral stresses and bending stresses at the interface regions A:B 118 are, to first order, zero.

The procedure for choosing materials and their thicknesses is as follows. If first material A 104a, 104b has a low TCE defined as $TCE_A$ while second material B 106a, 106b has a high TCE defined as $TCE_B$, then third material C 107 should have a $TCE_C$ which is greater than $TCE_A$. Fourth material D 108 should have a $TCE_D$ that is less than $TCE_B$ and less than $TCE_C$. The four materials have elastic moduli $E_A$, $E_B$, $E_C$, and $E_D$ and layer thicknesses $t_A$, $t_B$, $t_C$, and $t_D$. If $t_A$ and $t_B$ are first chosen, then $t_C$, and $t_D$ can be calculated.

TABLE 1

Properties of four chosen materials

| Material | Composition | TCE (ppm/° C.) | Elastic Modulus (Gpa) | Thickness mm |
|---|---|---|---|---|
| A | Fused silica | 0.55 ppm/° C. | 72.4 | 1.0 |
| B | Silicon | 2.6 ppm/° C. | 170 | 0.5 |
| C | Corning ™ 7740 glass (Pyrex ™) | 3.5 ppm/° C. | 62.7 | To be calculated |
| D | super Invar | 0.4 ppm/° C. | 141.3 | To be calculated |

As a first-order approximation, the TCEs, elastic moduli, and thicknesses of all four materials are assumed to be constant with temperature, while their lateral dimensions are assumed to vary with temperature.

Composite layer A/C/A 101 can be bonded together at the interfaces 119a and 119b between the layer of third material C 107 and the two layers 104a and 104b of first material A by a transparent UV curable adhesive 109 such as Norland Optical Adhesive 61 from Norland Products, Inc. This adhesive can withstand temperatures from −150° C. to 125° C. and has a tensile strength of 3000 psi≈20 Mpa (no shear strength data is available). Assume that the adhesive is cured at a temperature $T_{Hi}$=30° C., and that the temperature of sandwich A/C/A 101 is reduced to $T_{Low}$=−40° C. Composite layer A/C/A 101 should remain flat over this temperature range and should match the thermal expansion of composite layer B/D/B 102 over this temperature range.

Figure 3:
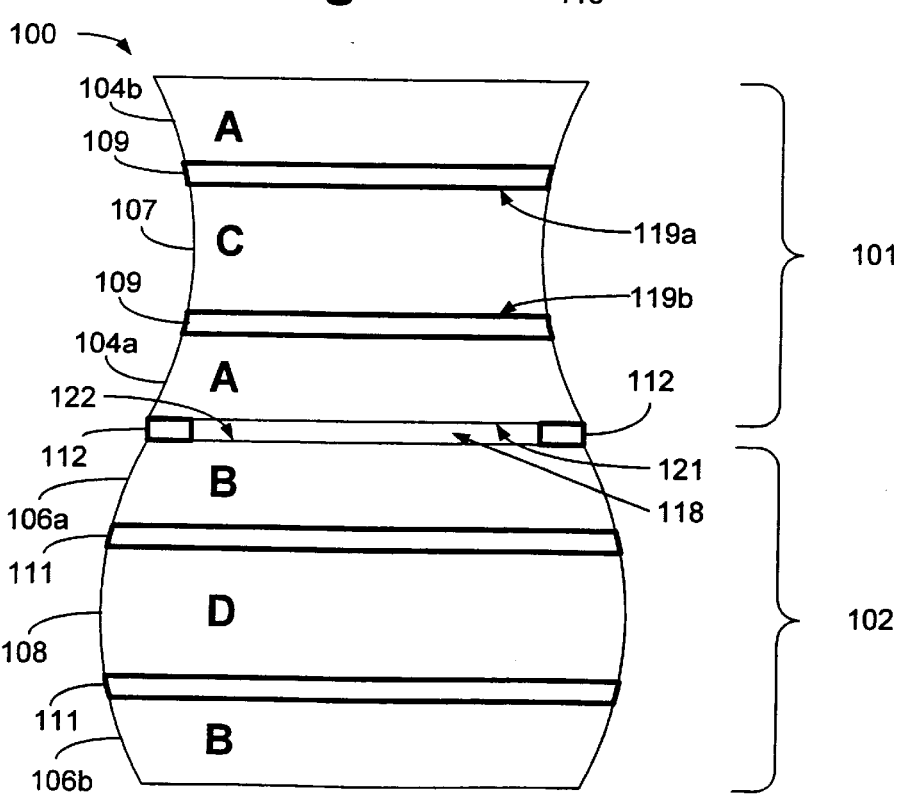
FIG. 3 is a cross-sectional schematic view illustrating the microsystem of FIG. 2 under thermal stress.

FIG. 3 is a cross-sectional schematic view illustrating the microsystem 100 of FIG. 2 under thermal stress. Assume that the lateral TCE of both composite layer A/C/A 101 and composite layer B/D/B 102 are desired to be halfway between the 0.55 ppm/° C. TCE of first material A 104a and the 2.6 ppm/° C. TCE of second material B 106a. The desired TCE value is then $TCEA_{A/C/A}$=$TCE_{B/D/B}$=(0.55+2.6)/2 ppm/° C.32 1.575 ppm/° C.

As composite layer A/C/A 101 undergoes thermal excursions, the interior layer of third material C 107, having $TCE_C$>$TCE_A$, attempts to shrink by a relatively large amount, but its lateral dimensional changes are restrained by the exterior layers 104a and 104b of first material A. Similarly, the layers 104a and 104b of first material A attempt to shrink by a relatively small amount, but their lateral dimensional changes are increased by forces from the interior layer 107 of third material C. The forces required to restrain each layer from its free state to its restrained state are generated as shear stresses at the two interfaces 119a and 119b, respectively, between the layer 107 of third material C and the two layers 104a and 104b of first material A.

The lateral force per unit change in temperature generated by the exterior layers 104a and 104b of first material A can be calculated. This force is then balanced against an opposing lateral force per unit width per unit temperature change generated by layer 107 of third material C, and the thickness of layer C 107 necessary to generate this force is calculated as follows.

Were first material A not restrained it would expand with temperature as $$L_{A2}/L_{A/C/A,1}=[1+(T_{Hi}-T_{Low})\times TCE_A] \quad \text{(Eq. 1)}$$

where L is the length of the portion of material under consideration and T is the temperature. In its restrained state, layer A/C/A 101 expands with temperature as $$L_{A/C/A,2}/L_{A/C/A,1}=[1+(T_{Hi}-T_{Low})\times TCE_{A/C/A}] \quad \text{(Eq. 2.)}$$

The difference in length between the free state and the unrestrained state is then $$\Delta L_A/L_{A/C/A,1}=(L_{A2}-L_{A/C/A,2})/L_{A/C/A,1}=(T_{Hi}-T_{Low})\times(TCE_A-TCE_{A/C/A}) \quad \text{(Eq. 3)}$$

Similarly for third material C $$\Delta L_C/L_{C1}=(L_{C2}-L_{A/C/A,2})/L_{A/C/A,1}=(T_{Hi}-T_{Low})\times(TCE_C-TCE_{A/C/A}) \quad \text{(Eq. 4)}$$

The shear stress can be calculated using the equation of a spring, which is given by $$F=-kx \quad \text{(Eq. 5)}$$

where F is the force (for example, in Newtons) generated by the spring, k is the spring rate (for example, in Newtons per meter) and x is the displacement (for example, in meters). The negative sign indicates that the force acts against the displacement and tends to restore the spring to its unstretched length.

The layer 107 of third material C has $TCE_C$=3.5 ppm° C. and so attempts to shrink more than the outer layers 104a and 104b of first material A with $TCE_A$=0.55 ppm/° C. The spring force at the solder interfaces for a width w of the sandwich A/C/A 101 is then $$F=-k_A\times\Delta L \quad \text{(Eq. 6)}$$

The spring rate $k_A$ is given by $$k_A=(E_A\times w\times t_A)/\Delta L_A \quad \text{(Eq. 7)}$$

For layer 107 of third material C to counteract the force and displacement of the two layers 104a and 104b of first material A over the entire temperature range, it should have a spring rate $k_C$=$k_A$ given by $$k_C=(E_C\times w\times t_C/2)/\Delta L_C \quad \text{(Eq. 8)}$$

Note that, since layer 107 of third material C is acted on by the two outer layers 104a and 104b of first material A, its thickness is divided by two in Equation 8.

Setting the right-hand sides of Equations 7 and 8 to be equal, and inserting the expressions for $\Delta L_A$ and $\Delta L_C$ from Equations 3 and 4, allows a solution for the thickness $t_C$ of the layer 107 of third material C. For the values given by Table 1 above, the resulting value is $t_C$=1.23 mm.

Still referring to FIG. 3, assume that composite layer B/D/B 102 is bonded together by solder 111 such as Indalloy Sn62 from the Indium Corporation of America, which freezes at T=179° C. and has a shear strength of 7540 psi≈52 Mpa The thickness of the layer 108 of super Invar required to achieve the desired lateral thermal expansion coefficient $TCE_{B/D/B}$=1.575 ppm/° C. can be calculated in a manner similar to that above. This value is $t_D$=0.68 mm.

The two composite layers A/C/A 101 and B/D/B 102 can then be bonded together to form microsystem 100 using, for example, a solder 112 such as Indalloy 158 which freezes at T=70° C. and has a low shear strength of 300 psi≈2.1 Mpa. If the thicknesses of the layer 107 of third material C and the layer 108 of fourth material D are chosen correctly, this weaker solder undergoes essentially zero stress during temperature excursions.

In a typical microsystem, the gap 118 between composite layers A/C/A 101 and B/D/B 102 is very small, typically on the order of several micrometers. In a 32×32 optical crosspoint switch the gap can be one to ten micrometers in thickness In other microsystems such a gap may be as small as 0.1 micrometer, or may become as large as 100 micrometers. All such gaps fall within the scope of the invention.

The lateral dimensions of microsystems in which the invention is employed are typically in the range of several millimeters to tens of millimeters. For example, in a 32×32 optical crosspoint switch the optical waveguides may be spaced on 250 micrometer centers, resulting in lateral dimensions on the order of 32×250 um=8000 um=8 mm. Furthermore, in microsystems having smaller lateral dimensions bimetal effects can often be tolerated, but the use of the invention may be beneficial in such systems when the gap between the composite layers is small.

Although described above as being bonded together, there are situations, such as test and verification operations, in which the two composite layers A/C/A 101 and B/D/B 102 are not permanently joined.

If composite layers A/C/A 101 and B/D/B 102 are sealed to one another to form a hermetically sealed chamber between them, atmospheric pressure changes, or deliberately applied pressure changes, may cause the gap between the composite layers to vary with pressure. In such cases it may be desirable to incorporate support posts (not shown) into the interior of the gap 118. Such support posts do not depart from the scope of the invention.

Figure 4:
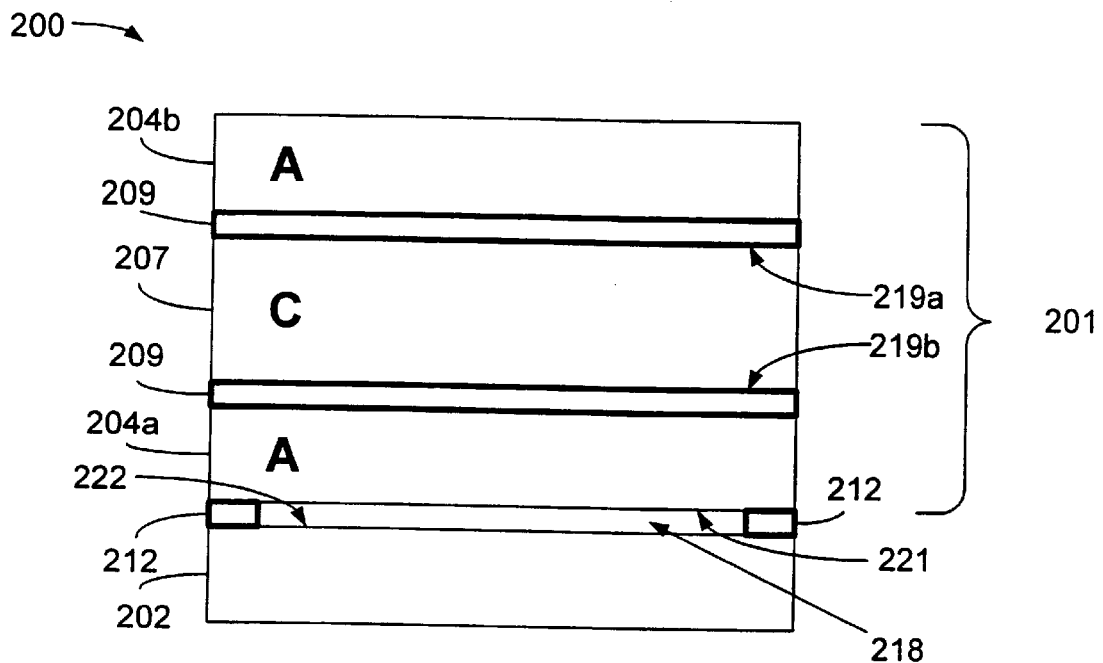
FIG. 4 is a cross-sectional schematic view of a second embodiment of a microsystem constructed in accordance with the invention.

FIG. 4 is a cross-sectional schematic view of a second embodiment of a microsystem 200 constructed in accordance with the invention.

Microsystem 200 includes planar substrate 201 and planar substrate 202. Planar substrate 201 is similar to composite layer 101 disclosed above with respect to FIG. 2 and will not be again described in detail. The elements of composite layer 201 that are similar to the elements of composite layer 101 are denoted by similar reference numerals in which reference numerals that begin with the number 2 in FIG. 4 correspond to elements in FIG. 2 having reference numerals that begin with the number 1. For example, composite layer 201 of FIG. 4 corresponds to composite layer 101 of FIG. 2.

In a departure from that described with respect to FIG. 2, planar substrate 202 is preferably a single layer of material having a TCE similar to that of the TCE of composite layer 201. Composite layer 201 is joined to planar substrate 202 via solder connections 212 in similar fashion to that described with respect to solder joints 112 of FIG. 2.

The lateral TCE of composite layer A/C/A 201 is higher than the TCE of material A. i.e., layers 204a and 204b alone, and equal to the TCE of the material comprising planar substrate 202. Because it is symmetrical, the composite layer A/C/A 201 does not bend or warp during temperature excursions so long as the temperature through the layer 201 is uniform.

Figure 5:
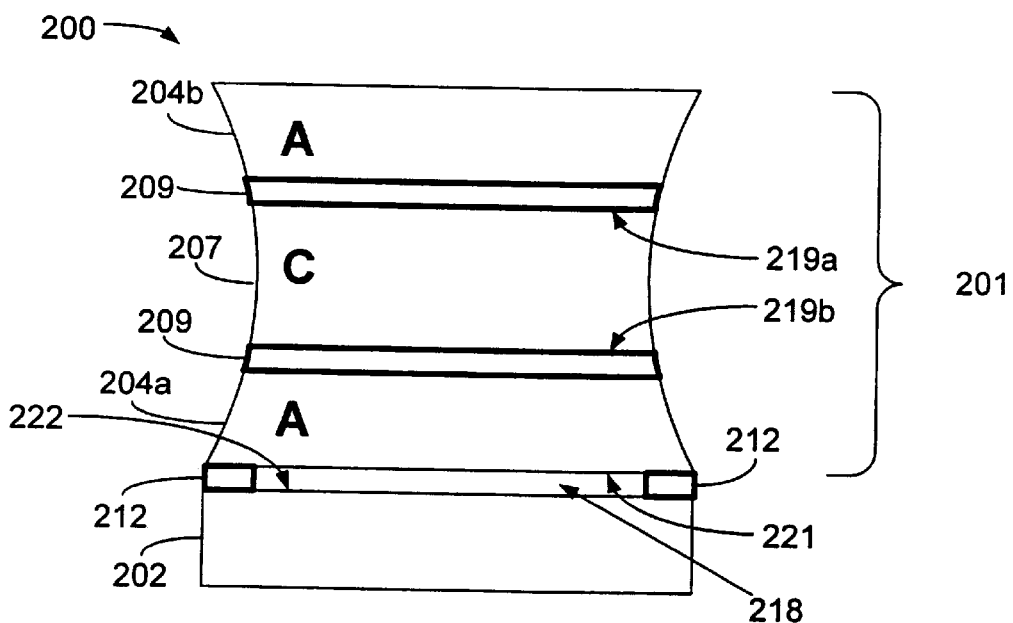
FIG. 5 is a cross-sectional schematic view illustrating the microsystem of FIG. 4 under thermal stress.

FIG. 5 is a cross-sectional schematic view illustrating the microsystem 200 of FIG. 4 under thermal stress. As composite layer A/C/A 201 undergoes thermal excursions the interior layer of third material C 207 $TCE_C > TCE_A$, attempts to shrink by a relatively large amount. However, the exterior layers 204a and 204b of first material A restrain its lateral dimensional changes. Similarly, the layers 204a and 204b of first material A attempt to shrink by a relatively small amount, but their lateral dimensional changes are increased by forces from the interior layer 207 of third material C. The forces required to restrain each layer from its free state to its restrained state are generated as shear stresses at the two interlaces 219a and 219b, respectively, between the layer 207 of third material C and the two layers 204a and 204b of first material A.

The lateral force per unit change in temperature can be calculated for composite layer 201 similar to that calculated for composite layer 101 of FIG. 2 and will not be repeated.

In accordance with the invention, the TCE of composite layer A/C/A 201 closely matches the TCE of planar substrate 202, with the result that the interface 218 between composite layer 201 and planar substrate 202 remains constant over the full range of temperature excursions as explained above.

It will be apparent to those skilled in the art that many modifications and variations may be made to the preferred embodiments of the present invention, as set forth above, without departing substantially from the principles of the present invention. For example, the above calculations, and the numbers calculated from them serve merely as first-order approximations. Furthermore, although described in FIGS. 4 and 5 as using composite layer A/C/A joined to a single layer of another planar substrate, the invention also contemplates the use of composite layer B/D/B joined to another single layer planar substrate. Further still various adhesion enhancing layers known to those skilled in the art may be added to the composite layers without departing from the scope of the invention, and the methodology embodied in the above example may be extended to composite layers of greater than three layers. All such modifications and variations are intended to be included herein within the scope of the present invention, as defined in the claims that follow.

What is claimed is:

1. A method for fabricating a low-stress interface between a first material and a second material having a dissimilar thermal coefficient of expansion (TCE), the method comprising the steps of:

forming a laminate including a first layer of said first material and a second layer of an additional material and having a layer of a third material sandwiched therebetween, said laminate having a substantially planar surface and a lateral thermal coefficient of expansion (TCE) in a direction lying parallel to said substantially planar surface; and joining said laminate to a second material having a substantially planar surface and a lateral TCE similar to the lateral TCE of said laminate so that said laminate and said second material define a cavity bounded by said low-stress interface.

2. The method of claim 1, wherein the TCE of said third material differs from the TCE of said first material in a direction toward the TCE of said second material, such that said laminate exhibits substantially zero bowing during temperature excursions.

3. The method of claim 1, wherein said second material exhibits substantially zero bowing during temperature excursions, such that the thermal expansion of said second material in a lateral direction parallel to said substantially planar surface of said second material is substantially equal to the thermal expansion of said laminate in the lateral direction parallel to the substantially planar surface of said laminate.

4. The method of claim 1, wherein said step of joining places said substantially planar surface of said laminate proximate and parallel to said substantially planar surface of said second material such that said substantially planar surface of said laminate and the substantially planar surface of said second material remain in close alignment over temperature excursions.

5. The method of claim 1, wherein said first layer of said first material and said second layer of said additional material have substantially similar TCE's.

6. The method of claim 1, wherein said first layer of said first material and said second layer of said additional material are formed of the same material.

7. The method of claim 1, wherein said first layer of said first material and said second layer of said additional material are formed of different materials.

8. The method of claim 1, wherein said second material further comprises a laminate formed by performing the steps of:
   forming a first layer of said second material, said second material having a substantially planar surface,
   forming a layer of a fourth material, and
   forming a second layer of said second material wherein the TCE of said fourth material differs from the TCE of said second material in a direction toward that of said first material.

9. The method of claim 1, wherein said second material further comprises a laminate formed by performing the steps of:
   forming a first layer of said second material, said second material having a substantially planar surface,
   forming a layer of a fourth material, and
   forming a second layer of an additional material wherein the TCE of said fourth material differs from the TCE of said second material in a direction toward that of said first material, and wherein said first layer of said second material and said second layer of said additional material have substantially similar TCE's.

10. The method of claim 1, wherein said joining step includes the step of soldering said substantially planar surface of said laminate to said substantially planar surface of said second material.

11. The method of claim 1, wherein said joining step includes the step of non-permanently attaching said substantially planar surface of said laminate to said substantially planar surface of said second material.

12. The method of claim 1, wherein a gap formed between said laminate and said second material is between 0.1 micrometer and 100 micrometers.

13. The method of claim 1, wherein said laminate and said second material have a lateral dimension between 1 millimeter and 100 millimeters.

14. A low-stress interface between a first material and a second material having a dissimilar thermal coefficient of expansion (TCE), comprising:
   a laminate including a first layer of said first material and a second layer of an additional material and having a layer of a third material sandwiched therebetween, said laminate having a substantially planar surface and a lateral thermal coefficient of expansion (TCE) in a direction lying parallel to said substantially planar surface; and
   a second material joined to said laminate to form said low-stress interface, said second material having a substantially planar surface and a lateral TCE similar to that of said laminate so that said laminate and said second material define a cavity bounded by said low-stress interface.

15. The low-stress interface of claim 14, wherein the TCE of said third material differs from the TCE of said first material in a direction toward the TCE of said second material.

16. The low-stress interface of claim 14, wherein the thermal expansion of said second material in a lateral direction parallel to said substantially planar surface of said second material is substantially equal to the thermal expansion of said laminate in the lateral direction parallel to said substantially planar surface of said laminate.

17. The low-stress interface of claim 14, wherein said first layer of said first material and said second layer of said additional material have substantially similar TCE's.

18. The low-stress interface of claim 14, wherein said first layer of said first material and said second layer of said additional material comprise the same material.

19. The low-stress interface of claim 14, wherein said first layer of said first material and said second layer of said additional material comprise different materials.

20. The low-stress interface of claim 14, wherein said second material further comprises a laminate, comprising:
   a first layer of said second material, said second material having a substantially planar surface,
   a layer of a fourth material, and
   a second layer of said second material wherein the TCE of said fourth material differs from the TCE of said second material in a direction toward that of said first material.

21. The low-stress interface of claim 14, wherein said second material further comprises a laminate, comprising:
   a first layer of said second material, said second material having a substantially planar surface,
   a layer of a fourth material, and
   a second layer of an additional material wherein the TCE of said fourth material differs from the TCE of said second material in a direction toward that of said first material, and wherein said first layer of said second material and said second layer of said additional material have substantially similar TCE's.

22. The low-stress interface of claim 14, wherein said laminate and said second material are joined by a solder connection.

23. The low-stress interface of claim 14, wherein said laminate and said second material are joined by a non-permanent connection.

24. The low-stress interface of claim 14, wherein a gap formed between said laminate and said second material is between 0.1 micrometer and 100 micrometers.

25. The low-stress interface of claim 14, wherein said laminate and said second material have a lateral dimension between 1 millimeter and 100 millimeters.

* * * * *